United States Patent [19]
Kobayashi et al.

[11] Patent Number: 5,803,800
[45] Date of Patent: Sep. 8, 1998

[54] VIBRATORY FINISHING MACHINE HAVING A HELICAL AND TUBULAR CONTAINER

[75] Inventors: Hisamine Kobayashi; Katsuhiro Izuhara, both of Nagoya, Japan

[73] Assignee: Tipton Corp., Nagoya, Japan

[21] Appl. No.: 742,180

[22] Filed: Oct. 30, 1996

[30] Foreign Application Priority Data

Oct. 30, 1995 [JP] Japan ................................. 7-306778
Mar. 6, 1996 [JP] Japan ................................. 8-048819

[51] Int. Cl.$^6$ ............................................. B24B 31/073
[52] U.S. Cl. ........................... 451/326; 451/8; 451/32; 241/175
[58] Field of Search ............................. 241/175; 451/8, 451/32, 104, 113, 326, 340

[56] References Cited

U.S. PATENT DOCUMENTS

| | | |
|---|---|---|
| 2,760,504 | 8/1956 | Spurlin . |
| 2,918,070 | 12/1959 | Carrier, Jr. . |
| 3,553,900 | 1/1971 | McKibben . |
| 3,618,267 | 11/1971 | Huber et al. . |
| 3,771,266 | 11/1973 | Kobayashi ............................. 451/326 |

FOREIGN PATENT DOCUMENTS

| | | |
|---|---|---|
| 01115568 A | 10/1987 | Japan . |
| 1541032 | 2/1990 | U.S.S.R. ............................... 451/326 |

*Primary Examiner*—Timothy V. Eley
*Attorney, Agent, or Firm*—Wenderoth, Lind & Ponack, L.L.P.

[57] ABSTRACT

A vibratory finishing machine includes a base having an upper face, coil springs mounted on the upper face of the base, a vibrator having an outer peripheral face and mounted on the base via the coil springs for vibration, a vibrating motor mounted on the vibrator, and a helical tubular container into which an admixture of workpieces to be finished and finishing media are loaded. The container has upper and lower flat superposed faces extending lengthwise and is helically wound on the outer peripheral face of the vibrator at a plurality of turns so that the upper and/or lower superposed faces of each turn of the container are superposed on the lower and/or upper superposed faces of the adjacent turn or turns respectively.

11 Claims, 18 Drawing Sheets

VIBRATORY FINISHING MACHINE HAVING A HELICAL AND TUBULAR CONTAINER

BACKGROUND OF THE INVENTION

1. Field of the invention

This invention relates to a vibratory finishing machine having helically wound tube assemblies in which workpieces to be finished and finishing media are subjected to vibratory act ion in admixture for the purpose of finishing the workpieces, and further to a method of making tubes constituting each tube assembly used in the vibratory finishing machine.

2. Description of the prior art

Vibratory finishing machines of the above-described type are known, and the machines comprise hoses or the like helically wound on a cylindrical member vibrated by an exciting means. The hoses are subjected to vibration so that workpieces and finishing media both loaded therein are vibrated so that the workpieces are polished, deburred or otherwise finished. More specifically, a vibrating motor is provided in the cylindrical member, and two, that is, inner and outer hoses (arcuate tube assemblies) are wound on an outer circumference of the cylindrical member vertically helically by a plurality of turns. The hoses are connected together so that the workpieces and media are circulated therethrough. Workpieces and finishing media are loaded into one of the hoses. The vibrating motor is energized to vibrate the cylindrical member such that the workpieces and media loaded therein are subjected to vibratory action to thereby be moved through the hoses. The workpieces are finished by the media during their vibratory movement.

The conventional hoses are helically wound on the cylindrical member at predetermined intervals so that a sufficient vertical gap is provided between turns of each hose. Furthermore, the hoses are fixed at suitable portions thereof to a machine casing by U-shaped fixtures.

The conventional vibratory finishing machine as described above has a problem that the workpieces and media are subjected to a non-uniform vibration throughout the finishing operation. This problem results from non-uniformity between the portions of each hose at which it is fixed to the machine casing and those at which it is not fixed thereto. Furthermore, each hose sometimes resonates if it is insufficiently fixed to the machine casing. Upon occurrence of resonance, the vibration to be applied to the workpieces and media is denied such that smooth vibratory movement of the workpieces and media is prevented and a proper finishing performance is not achieved.

To solve the above-described problem, the prior art has proposed a construction in which a filler is interposed between turns of each hose. The prior art has also proposed a construction in which the hoses are held, over their entire circumferences, by vertically disposed arcuate support blocks each accommodating to a semicircle of each hose. However, manufacture of vibratory finishing machines employing either construction is difficult. Furthermore, either construction lowers the efficiency in replacement of hoses. Consequently, both constructions cannot be employed in the vibratory finishing machines.

SUMMARY OF THE INVENTION

Therefore, an object of the present invention is to provide a vibratory finishing machine which can achieve a sufficient finishing performance.

Another object of the present invention is to provide a method of efficiently manufacturing an arcuate tube suitable for use in the above-mentioned vibratory finishing machine.

In one aspect, the present invention provides a vibratory finishing machine comprising a base having an upper face, resilient support means mounted on the upper face of the base, a vibrator having an outer peripheral face and mounted on the base via the support means for vibration, excitation means mounted on the vibrator, and a helical tubular container into which an admixture of workpieces to be finished and finishing media are loaded. The container has upper and lower flat superposed faces extending lengthwise thereof and being helically wound on the outer peripheral face of the vibrator at a plurality of turns so that the upper and/or lower superposed faces of each turn of the container are superposed on the lower and/or upper superposed faces of the adjacent turn or turns respectively.

The helical tubular container is helically disposed around the vibrator in the above-described construction. However, since the turns of the container are laid one upon another, the container can be stably supported. Accordingly, even when a supplemental support is given to the container by a machine housing or the like, an amount of the supplemental support can be reduced as compared with the prior art. Consequently, the vibration acting on the helical container can be rendered more uniform.

The helical tubular container preferably comprises a plurality of split tubes each having two ends and is formed by connecting one end of one split tube to one end of another split tube so that a tubular path having two open ends is provided.

In another aspect, the present invention provides a method of making a tube comprising the steps of forming a tubular core by helically winding a band-shaped member having two lengthwise ends while the ends of the band-shaped member are being adhered closely to each other, and disposing the core in a casting mold, pouring a forming material into a space defined between the casting mold and the core and hardening the forming material, and removing the core from the casting mold by pulling out one of the ends of the band-shaped member forming the core.

BRIEF DESCRIPTION OF THE DRAWINGS

Other objects, features and advantages of the present invent ion will become clear upon reviewing the following description of preferred embodiments thereof, made with reference to the accompanying drawings, in which.

DETAILED DESCRIPTION OF THE PREFERRED EMBODIMENT

Figure 1:
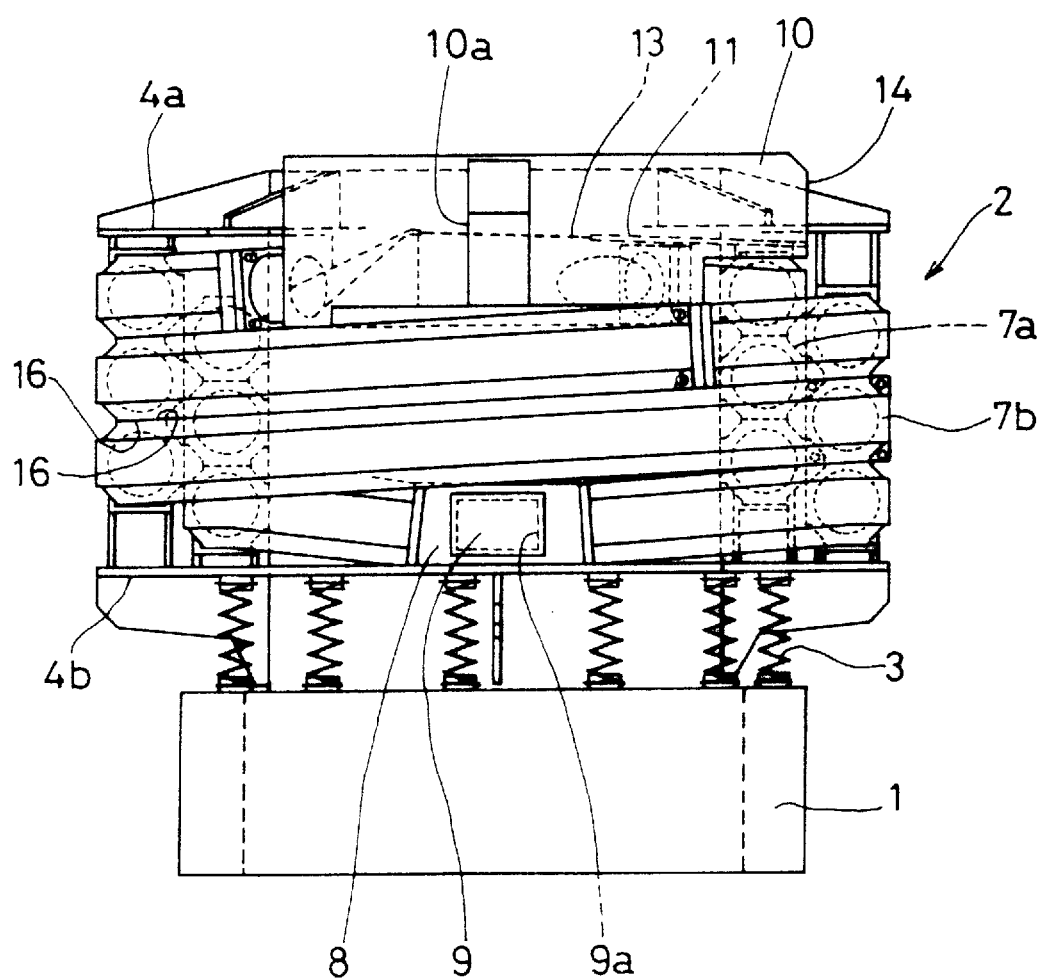
FIG. 1 is a front view of the vibratory finishing machine of a first embodiment in accordance with the present invention.
Figure 2:
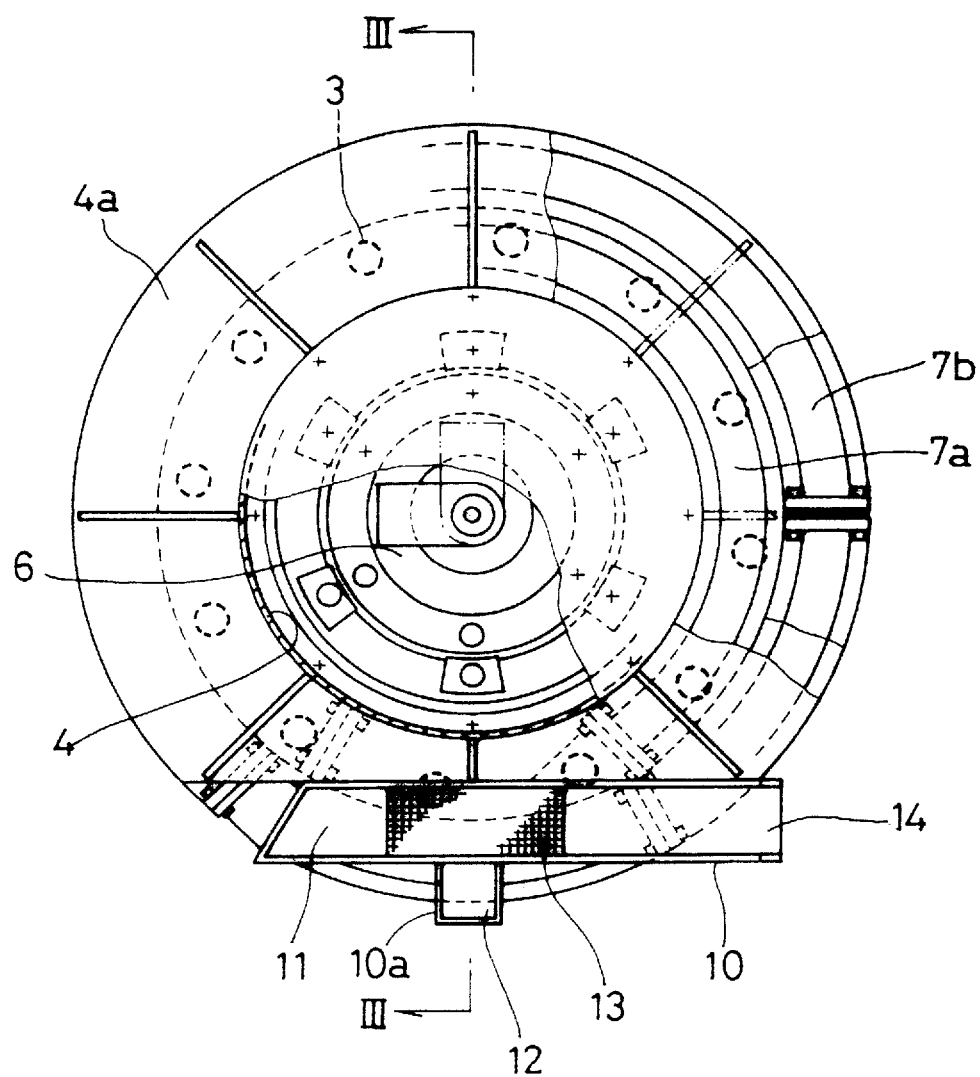
FIG. 2 is a partially broken plan view of the vibratory finishing machine.
Figure 3:
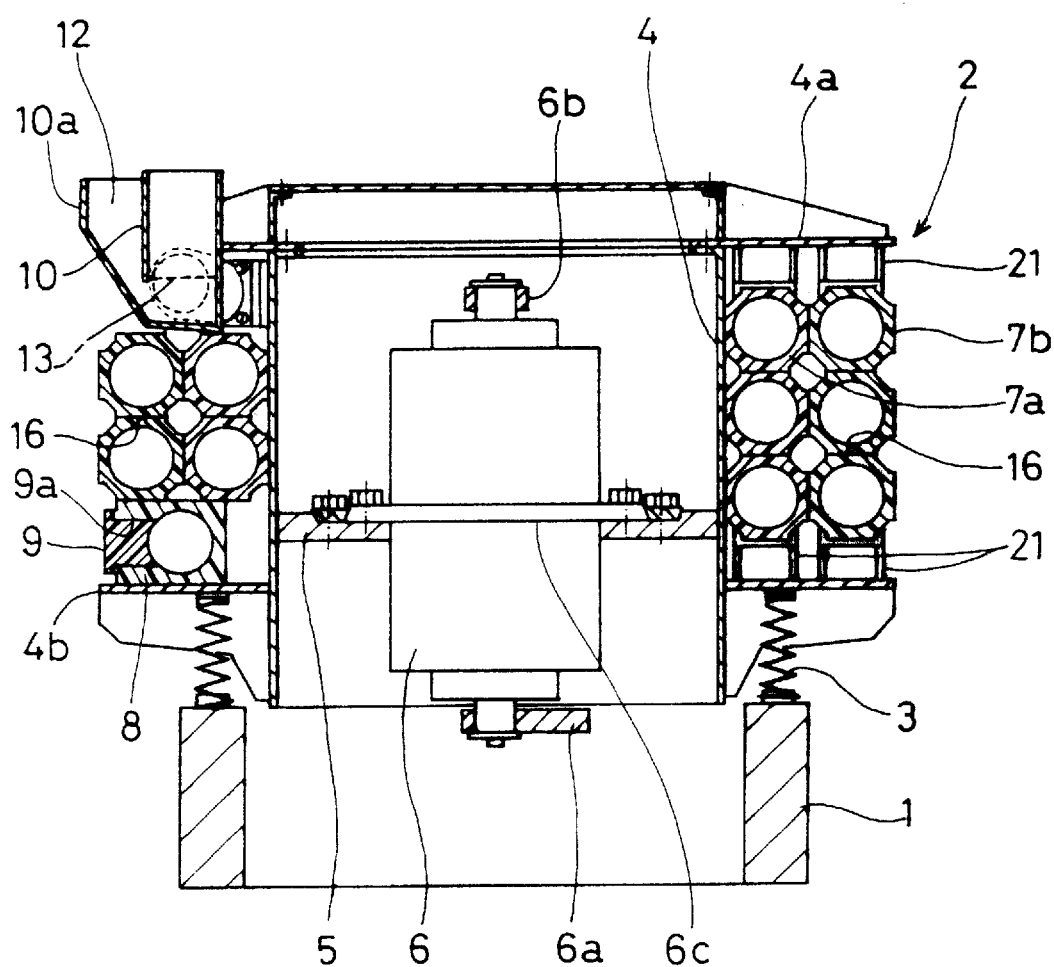
FIG. 3 is a sectional view taken along line III—III in FIG. 2.

An embodiment of the present invention will be described with reference to FIGS. 1 to 22. Referring first to FIGS. 1 to 3, an overall structure of a vibratory barrel finishing machine embodying the present invention is shown. The machine comprises a base 1, a main body 2 and a number of coil springs 3 mounted on an upper face of the base 1. The coil springs 3 are spaced circumferentially of the main body 2 to serve as resilient support means for resiliently supporting the main body 2. The main body 2 has a central cylindrical member 4 serving as a vibrator. The cylindrical member 4 has upper and lower flanges 4a and 4b formed by outwardly protruding upper and lower circumferential ends thereof respectively. The lower flange 4b is adapted to receive forces from the coil springs 3. An annular mounting plate 5 is fixed to an inner wall of the cylindrical member 4, as is shown in FIG. 3. An electric vibrating motor 6 of the vertical shaft type is mounted on a bracket 6c further mounted on the mounting plate 5. The motor 6 has two eccentric weights 6a and 6b mounted on upper and lower ends of its shaft respectively. The vibrating motor 6 constitutes excitation means for imparting a predetermined magnitude of vibration to workpieces and finishing media loaded in a helical tubular container so that the workpieces and media are moved through the tubular container in a manner as will be described later.

Inner and outer arcuate tube assemblies 7a and 7b constituting the helical tubular container are provided around the cylindrical member 4 between the upper and lower flanges 4a and 4b. In the helical tubular container shown in the drawings, the arcuate tube assemblies 7a and 7b are connected together at lower ends thereof to thereby provide a double three-turn helical tubular path.

The operation of the above-described finishing machine will briefly be described. The machine is first loaded with a predetermined amount of finishing media including abrasive grains, water, and so forth and then operated. The polishing or finishing operation is initiated at the upper end of the inner arcuate tube assembly 7a when workpieces are then loaded thereinto. The workpieces, media and the like are caused to move downwardly through a helical path defined by the inner arcuate tube assembly 7a. Reaching the lower end of the inner arcuate tube assembly 7a, the workpieces, media and the like move into the outer arcuate tube assembly 7b. The workpieces, media and the like then rise through the outer arcuate tube assembly 7b, reaching the upper end thereof. The finished workpieces are separated from the media and the like at the upper end of the outer tube assembly 7b.

The construction of the vibratory finishing machine will be described in detail. The inner and outer arcuate tube assemblies 7a and 7b are connected together at the lower ends thereof by a metal lower connecting pipe 8 which also seals the ends. The lower connecting pipe 8 has a discharge port 9a through which used-up finishing media and the like are removed. The discharge port 9a is formed in an outer circumferential face of connecting pipe 8 and usually closed by a cover plate 9. An inner wall of the lower connecting pipe 8 is covered by a polyurethane lining.

Upper ends of the inner and outer arcuate tube assemblies 7a and 7b communicate with each other via an upper connecting tub 10. The connecting tub 10 is formed by bending a metal plate and has an upper opening. The interior of the tub 10 is divided by a partition plate 11 into upper and lower compartments. A swollen plate 10a is mounted on the circumferential face of the tub 10. The swollen plate 10a is projected outwardly and has an upper opening which serves as an inlet 12 for workpieces to be finished. The inlet 12 communicates with the lower compartment of the connecting tub 10, which lower compartment further communicates with the upper end of the inner arcuate tube assembly 7a, as is shown in FIG. 3. The upper compartment of the tub 10 communicates with the upper end of the outer arcuate tube assembly 7b. Accordingly, the workpieces and finishing media are introduced into the upper compartment of the tub 10 when one cycle of the finishing operation is completed. The partition plate 11 has a central rectangular opening having a predetermined length. A screening net 13 is attached to the partition plate 11 so as to cover the opening. Meshes of the screening net 13 are dimensioned so that only the finishing media sifts therethrough into the lower compartment of the tub 10 but the workpieces are left on the net 13. The finishing media is returned to the inner arcuate tube assembly 7a for the subsequent finishing operation, whereas the finished workpieces on the screening net 13 can be taken out through an outlet 14 open at the circumferential side of the upper compartment of the tub 10.

Figure 4:
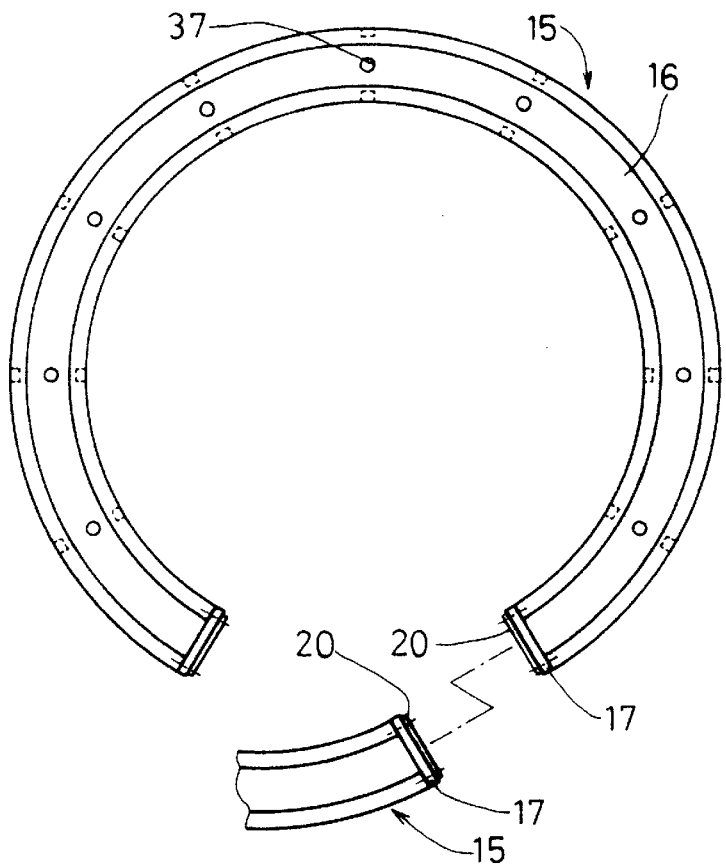
FIG. 4 is a plan view of a split tube employed in the vibratory finishing machine.
Figure 5:
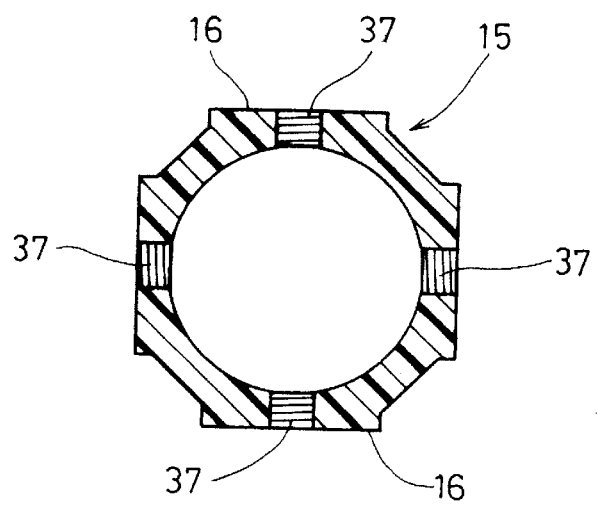
FIG. 5 is a transverse sectional view of the split tube.
Figure 6:
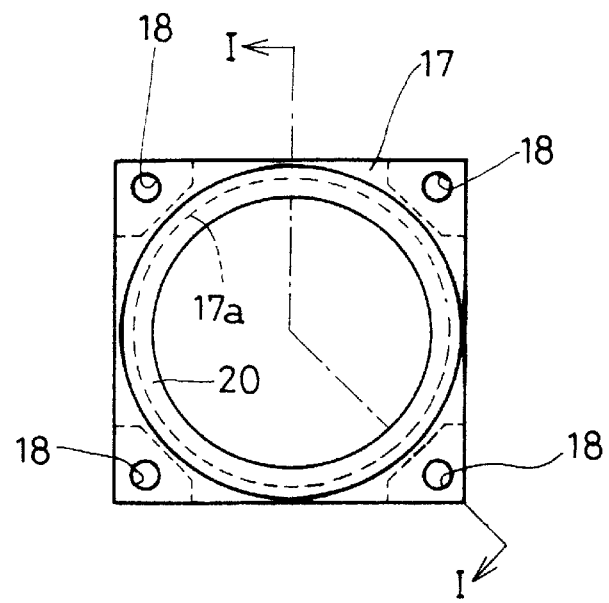
FIG. 6 is a front view of the split tube, showing connecting flanges provided at corners of the tube.
Figure 7:
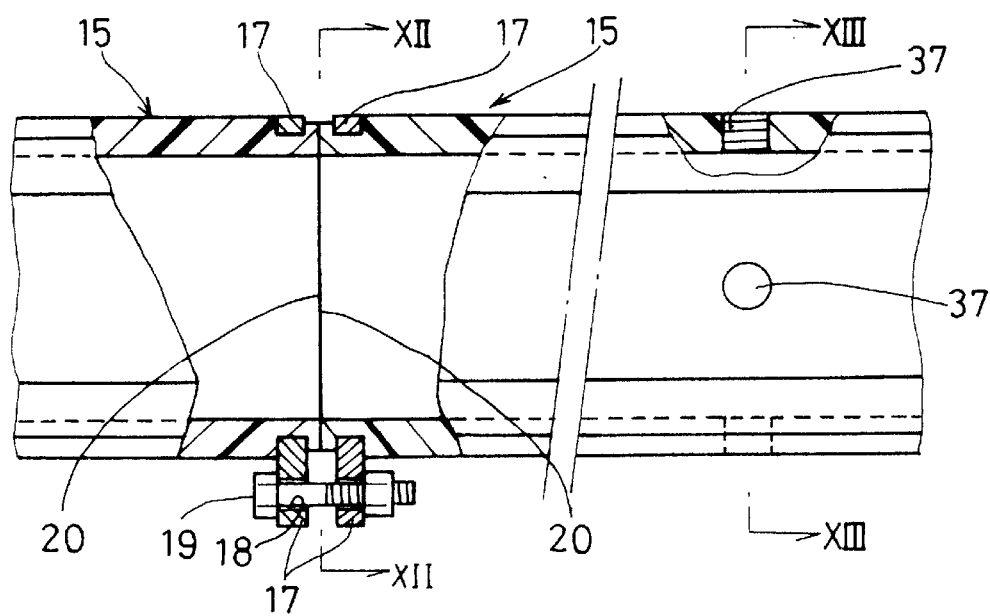
FIG. 7 is a partial sectional view taken along line I—I in FIG. 6, showing connected portions of the split tubes.
Figure 8:
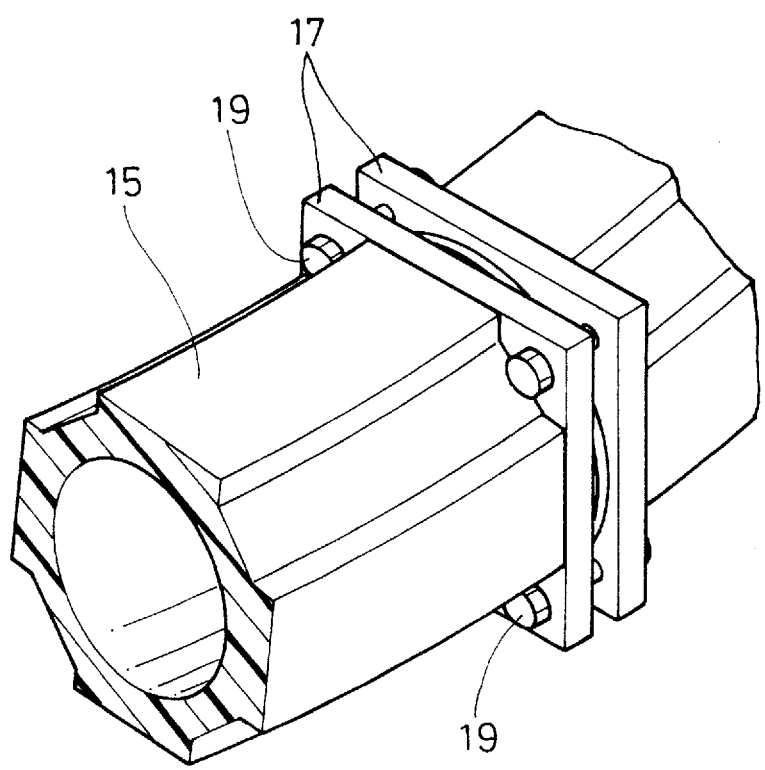
FIG. 8 is a perspective view of the connected portions of the split tubes.
Figure 9:
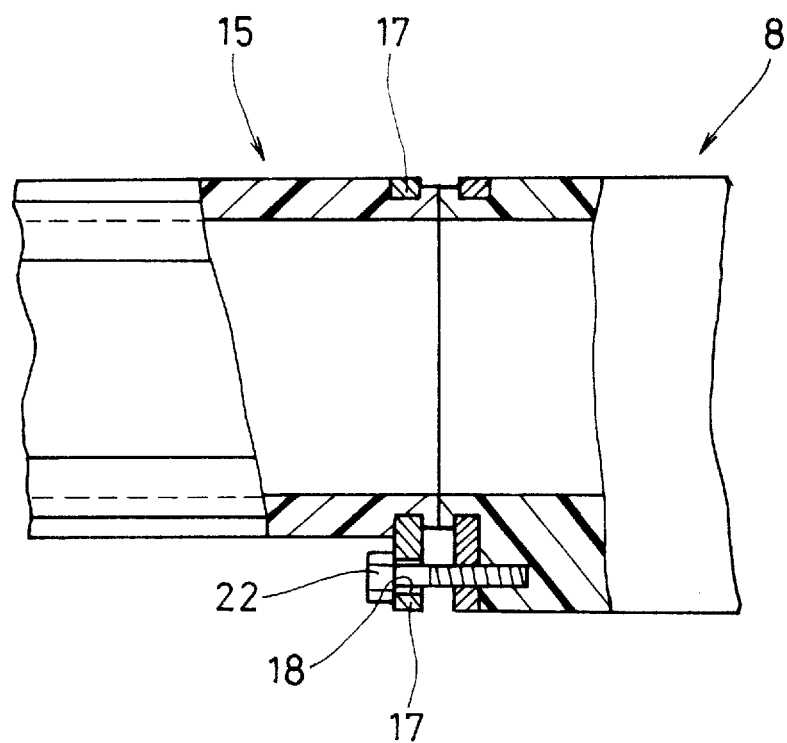
FIG. 9 is a partial sectional view taken along line I—I in FIG. 6, showing connection between the split tube and a lower connecting pipe.
Figure 10:
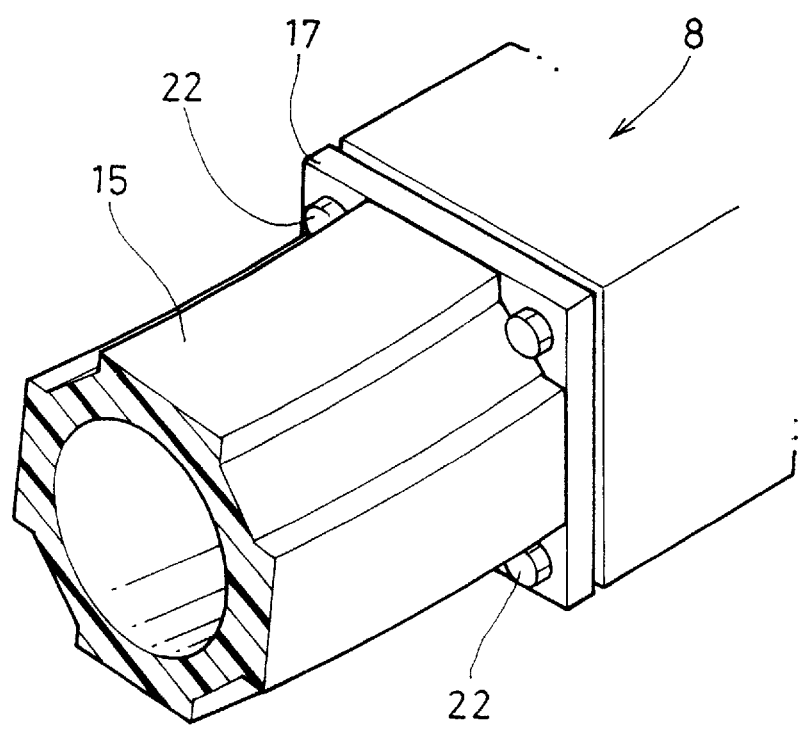
FIG. 10 is a perspective view of the joint between the split tube and the lower connecting pipe.

The inner and out arcuate tube assemblies 7a and 7b are helically wound as described above. In the embodiment, particularly, a plurality of split tubes 15 each having an arc with a central angle of about 300 degrees as shown in FIG. 4 are helically connected to one another. Each split tube 15 is formed of a polyurethane resin and has a suitable resiliency and proper wear and abrasion resistance against the finishing operation. Each split tube 15 has an octagonal transverse sectional configuration, as shown in FIG. 5. In attachment to the main body 2, the split tubes 15 are laid one upon another such that the outer side faces thereof are superposed on one another lengthwise thereof. Thus, the upper and lower faces of the outer side faces of each split tube 15 constitute superposed faces 16. Both ends of each split tube 15 have rectangular connecting flanges 17 integrally formed therewith respectively, as shown in FIGS. 6 and 7. Each connecting flange 17 has connecting through holes 18 formed in four corners thereof respectively. Bolts 19 are inserted through the connecting holes 18 of each split tube 15 and an adjacent one so that the connecting flanges 17 are connected to each other, whereupon the split tubes 15 are connected to one another. Both ends of each split tube 15 are provided with respective annular sealing surfaces each extending outwardly from an inner circumferential edge thereof. FIG. 9 shows a connection between the split tube 15 and the lower connecting pipe 8. In the prior art, a joint at the lower connecting pipe 8 side is inserted into a hose constituting the helical tubular container which has a diameter larger than the joint. An outer circumference of the hose is then fastened with a bolt. In this construction, however, the joints with different diameters form a step which is in a flow path of the workpieces and finishing media. Consequently, a biased wear would occur or flow of the workpieces and media would be prevented. In view of the above-described problem, this embodiment employs a structure which can avoid formation of such a step. More specifically, an end face of the split tube 15 has the same inner diameter as the joint at the lower connecting pipe 8 side and is butted against the joint. Bolts 22 are inserted into the respective connecting holes 18 of the connecting flange 17 formed on the end of the split tube 15 and screwed into the lower connecting pipe 8 side so that both parts are connected together.

The inner and outer arcuate tube assemblies 7a and 7b are wound around the cylindrical member 4 over its lower flange 4b. First turns of the tube assemblies 7a and 7b are placed on lower support rails 21 each having a helical up-grade, respectively, so that support for each tube assembly can be enhanced. Upper rails 21 fixed to the upper flange 4a are adapted to hold final turns of the tube assemblies 7a and 7b respectively, thereby enhancing support.

A main body housing (not shown) covering the arcuate tube assemblies is attached to the main body 2. The main body housing or the cylindrical member 4 Provides suitable auxiliary support means for supporting the arcuate tube assemblies 7a and 7b only at their several portions respectively.

Figure 11:
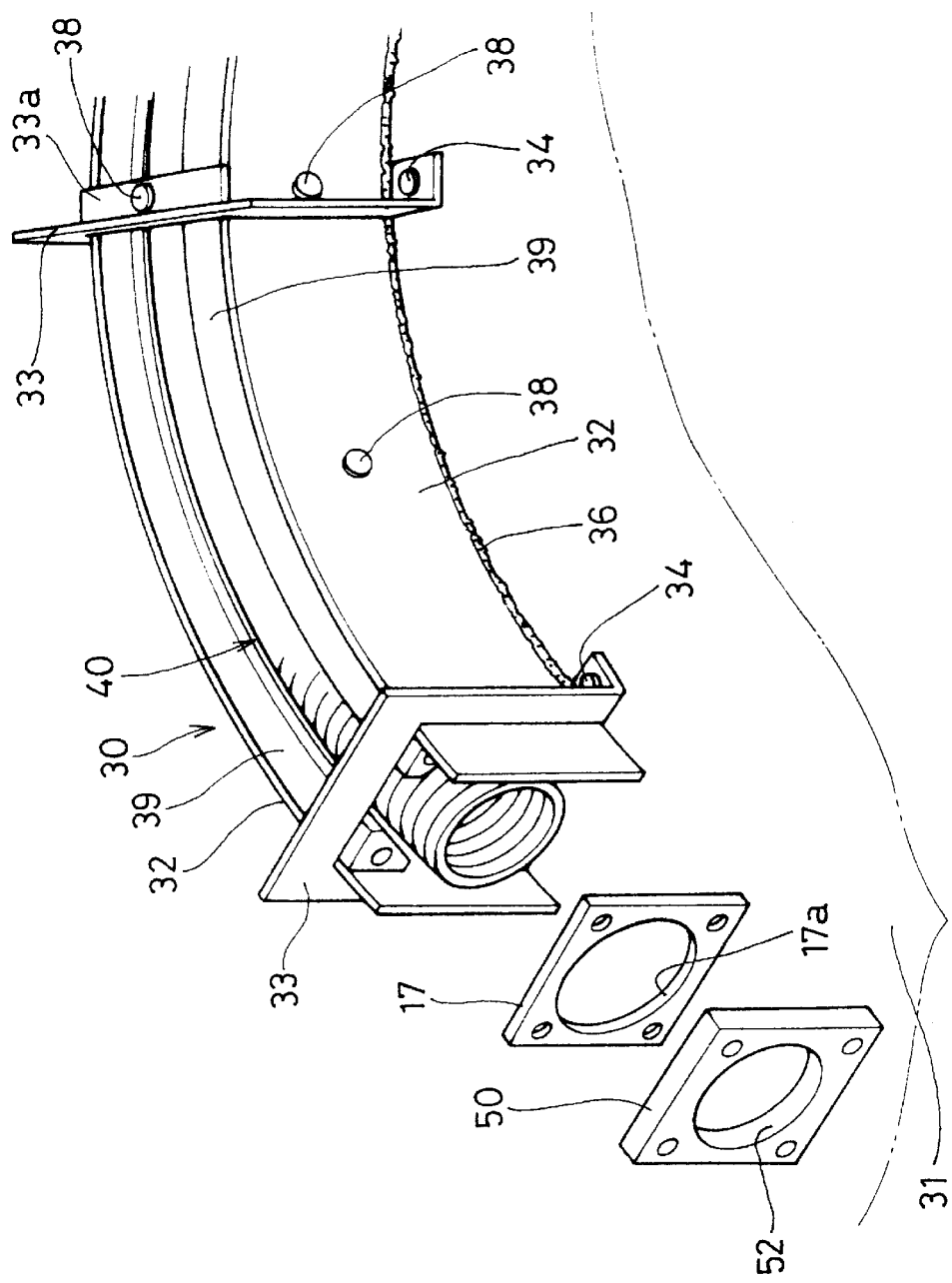
FIG. 11 is a perspective view of a casting mold for the split tube.
Figure 12:
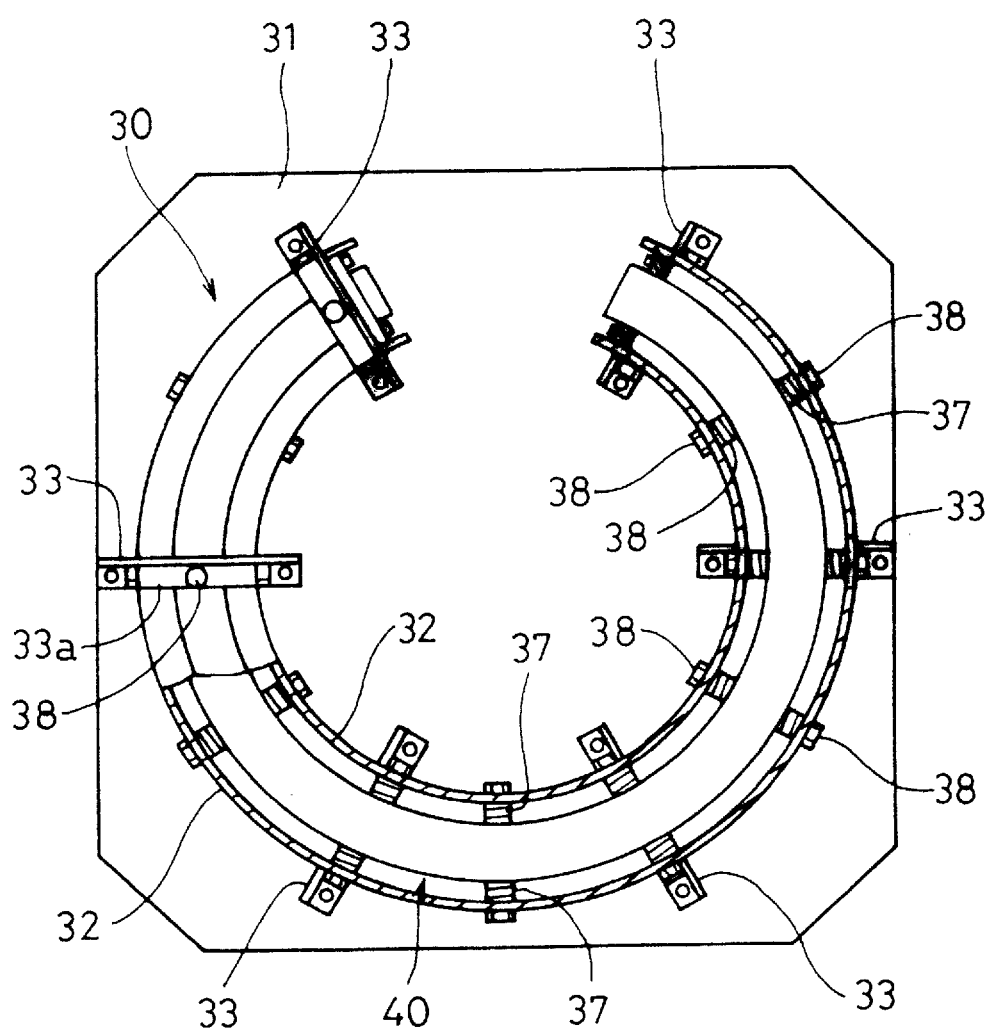
FIG. 12 is a partially sectional plan view of the casting mold.
Figure 13:
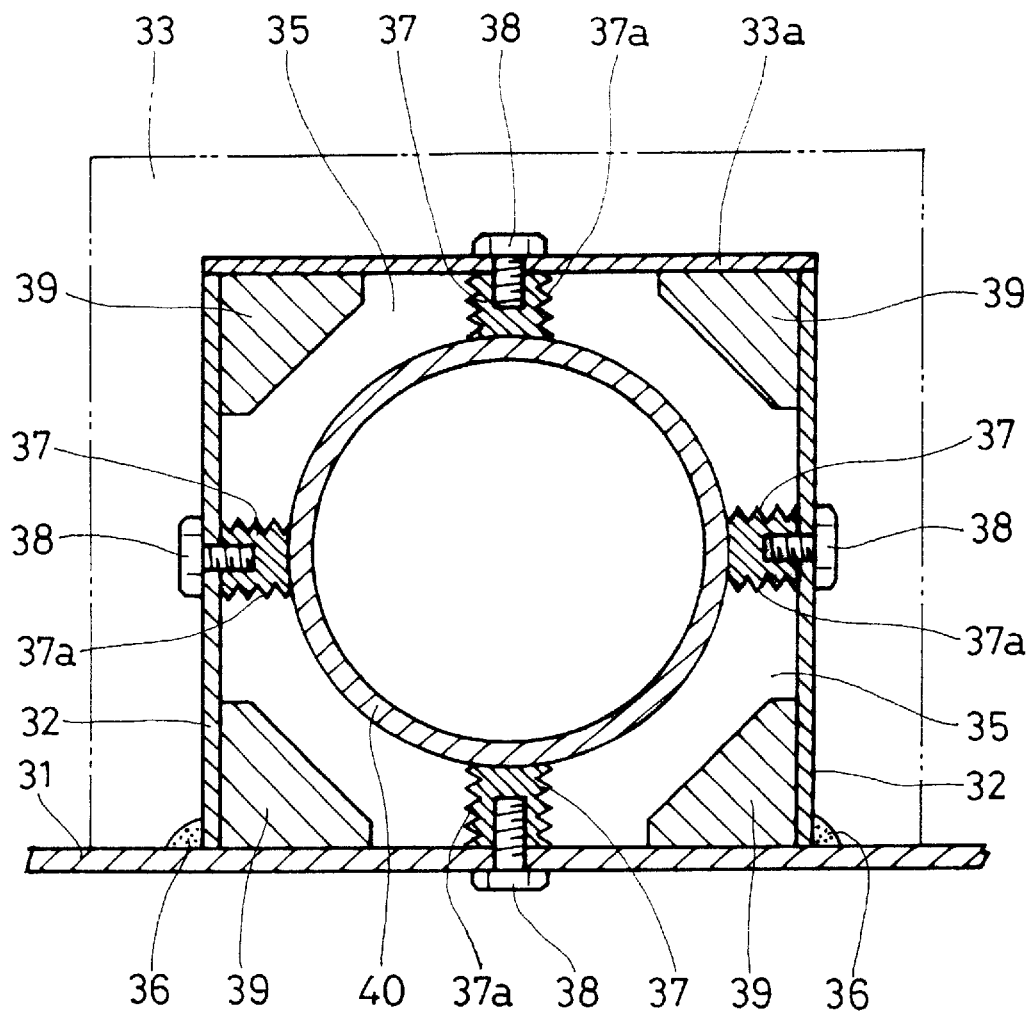
FIG. 13 is a sectional view of the casting mold.
Figure 14:
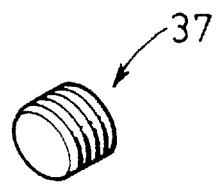
FIG. 14 is a perspective view of a positioning piece.

A method of making the split tube will now be described with reference to FIGS. 11 to 21. A casting mold 30 for the split tube will first be described. The casting mold 30 is formed into an arcuate shape having an arc with a central angle of about 300 degrees, as is shown in FIGS. 11 and 12. The casting mold 30 comprises a basement 31 and a pair of side walls 32 which are spaced from each other on the basement 31 and stand in parallel with each other. A plurality of portal support frames 33 are welded to both ends and middle portions of each side wall 32. The support frames 33 are also fixed by bolts 34 to the basement 31. Each side wall 32 has on its inner wall surface symmetrically mounted upper and lower convex members 39 each formed into a generally triangular prism and extending lengthwise thereof. Consequently, a cavity 35 having an octagonal section is defined in the interior of the casting mold 30, as is shown in FIG. 13. The casting mold 30 has an upper opening, through which a liquid of forming polyurethane resin is poured into the casting mold 30. A liquid of thermosetting polyurethane resin in the unhardened state is used as the liquid of forming polyurethane resin in the embodiment and will hereinafter be referred to as "liquid of urethane resin." Gaps between the basement 31 and the side walls 32 are filled by a sealing material so that the liquid of urethane resin can be prevented from leaking out of the casting mold 30.

A core 40 which will be described in detail later is placed in the casting mold 30 prior to casting. The core 40 is adapted to be supported by resin positioning pieces 37 in the center of the cavity 35 so as to be substantially coaxial with the casting mold 30 and apart from the basement 31. More specifically, a plurality of sets of positioning pieces 37 each of which sets includes three or four positioning pieces are disposed at regular intervals in the casting mold 30. In the case of each set of three positioning pieces 37, they are fixed to the basement 31 and the side walls 32 by bolts 38 respectively. The core 40 is supported by the positioning pieces 37 disposed at intervals of 90 degrees. In the case of each set of four positioning pieces 37, they are disposed with the support frames 33. Three of the four positioning pieces 37 are fixed to the basement 31 and the side walls 32 by the bolts 38 respectively in the same manner as described above. The other positioning piece 37 is disposed on each support frame 33. Each support frame 33 has a mounting strip 33a which hangs horizontally along the upper open edge thereof so as to bridge across the casting mold 30 between the side walls 32 thereof. The positioning piece 37 is fixed to each mounting strip 33a on the center thereof by the bolt 38. The core 40 is supported from four sides by the positioning pieces 37 disposed at intervals of 90 degrees. Each positioning piece 37 is formed of a hardened polyurethane resin into the shape of a short column and has a number of annular ribs 37a on its outer circumferential surface. One end of each positioning piece 37 is stuck to the basement 31, the side walls 32 or the mounting strips 33a whereas the other end thereof is butted against an outer circumferential surface of the core 40. The annular ribs 37a of each positioning piece 37 are adapted to increase an adhesion strength to the completed split tube 15, thereby preventing each positioning piece 37 from falling off after the casting and securing sealing performance between each positioning piece 37 and the split tube 15.

Figure 15:
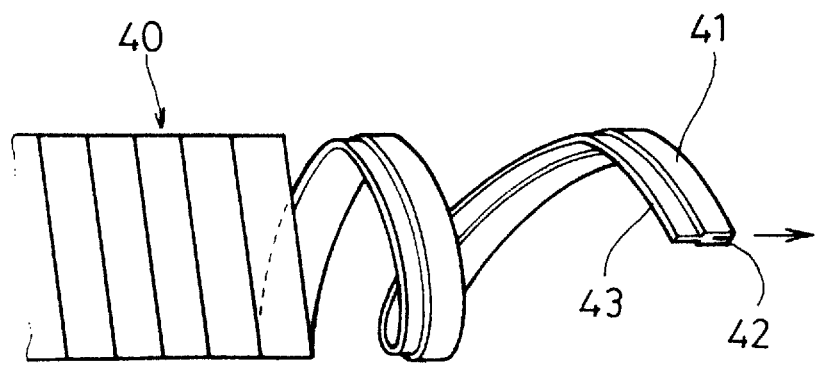
FIG. 15 is a side view of a core.
Figure 16:
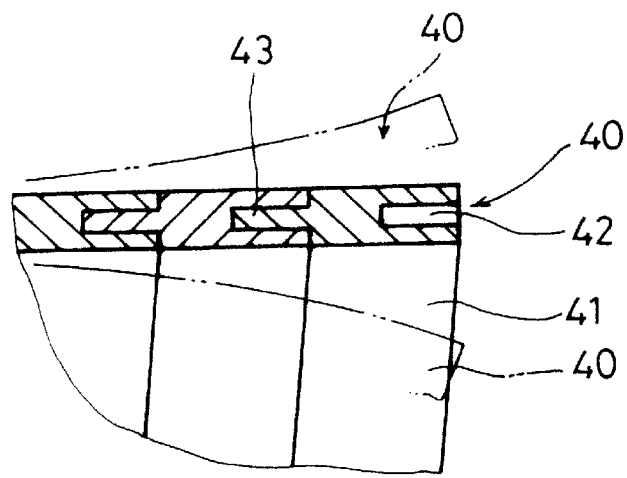
FIG. 16 is a partially enlarged section of the core.
Figure 17:
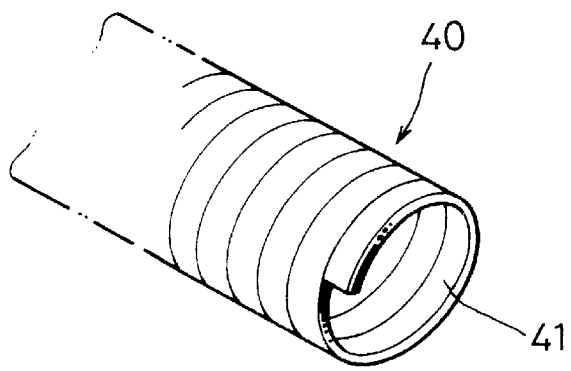
FIG. 17 is a perspective view of the core.

The core 40 will now be described in detail. The core 40 has a generally tubular configuration as is shown in FIG. 11. The core 40 is formed by helically winding a long strip member 41 so that one turn thereof is closely adhered to another, as is shown in FIG. 15. More specifically, the strip member 41 is formed in its one of two side edges with a slit or engagement groove 42 extending lengthwise thereof, as is shown in FIG. 16. The strip member further has on the other side protruding edge or engagement protrusion 43 protruding widthwise thereof and extending lengthwise thereof. The engagement protrusion 43 is insertable into the engagement groove 42. Accordingly, when the strip member 41 is helically wound so that one turn thereof is closely adhered to another or so that the engagement protrusion 43 is inserted into the engagement groove 42, the obtained tubular core 40 (see FIG. 17) substantially has no gaps in the circumferential surface thereof and secures the sealing performance against the polyurethane resin as the forming material. Since the depth of insertion of the protrusion 43 into the groove 42 is variable, the curvature of the core 40 can be changed freely unless the protrusion 43 is separated from the groove 42.

Figure 18:
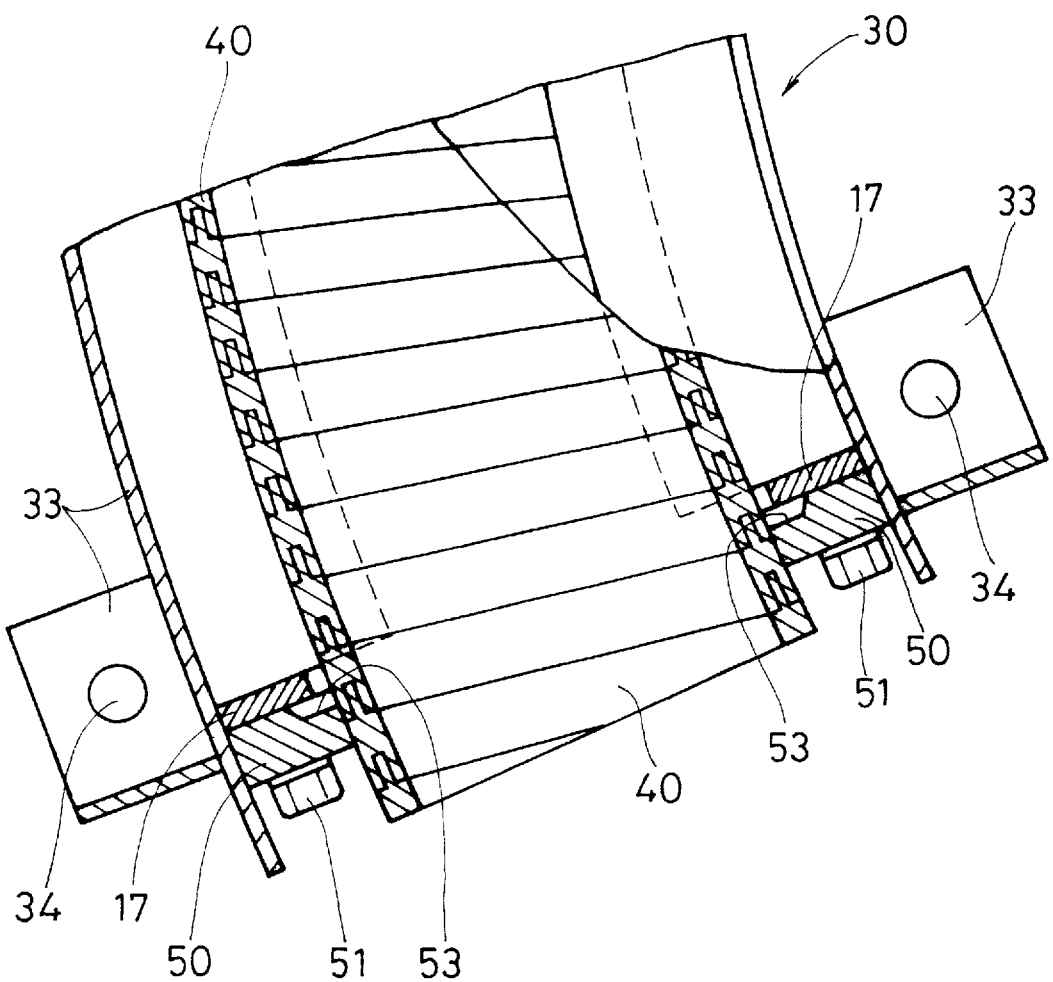
FIG. 18 is a sectional view of the casting mold, showing ends thereof.

Two rectangular sealing surface forming molds 50 are attached to both ends of the casting mold 30 respectively. Each mold 50 is formed into the shape of a rectangular plate having a vertical dimension slightly smaller than the connecting flange 17, as is shown in FIGS. 11 and 18. The molds 50 are fixed by bolts 51 to the support frames 33 so that the connecting flanges 17 located at both ends of the split tube 15 are held between the molds 50 and the support frames 33, respectively. Each connecting flange 17 is formed into a rectangular shape and has a circular opening 17a having a diameter larger than an outer diameter of the core 40. Consequently, the core 40 is inserted through the openings 17a of the connecting flanges 17 and in this state, the core 40 can be fixed to the casting mold 30. Furthermore, each sealing surface casting mold 50 has a core insertion opening 52 through which the core 40 is fitted and an annular concave portion 53 formed along the circumferential edge of the opening 52 in the inner surface thereof relative to the casting mold 30.

A procedure for making the split tube 15 will be described. First, the core 40 is formed by helically winding the strip member 41 so that one turn thereof is closely adhered to another or so that the engagement protrusion 43 is continuously inserted into the engagement groove 42. A mold release is previously applied to the inner wall surfaces of the casting mold 30 and the outer circumferential surface of the core 40 so that a subsequent mold releasing is efficiently performed. The core 40 is set between the side walls 32 of the casting mold 30 to be coaxial with the latter, being arcuately curved along the casting mold 30. The positioning pieces 37 are previously fixed to the casting mold 30 by the bolts 38 so as to assume respective predetermined positions. The core 40 is placed on the positioning pieces 37.

Figure 19:
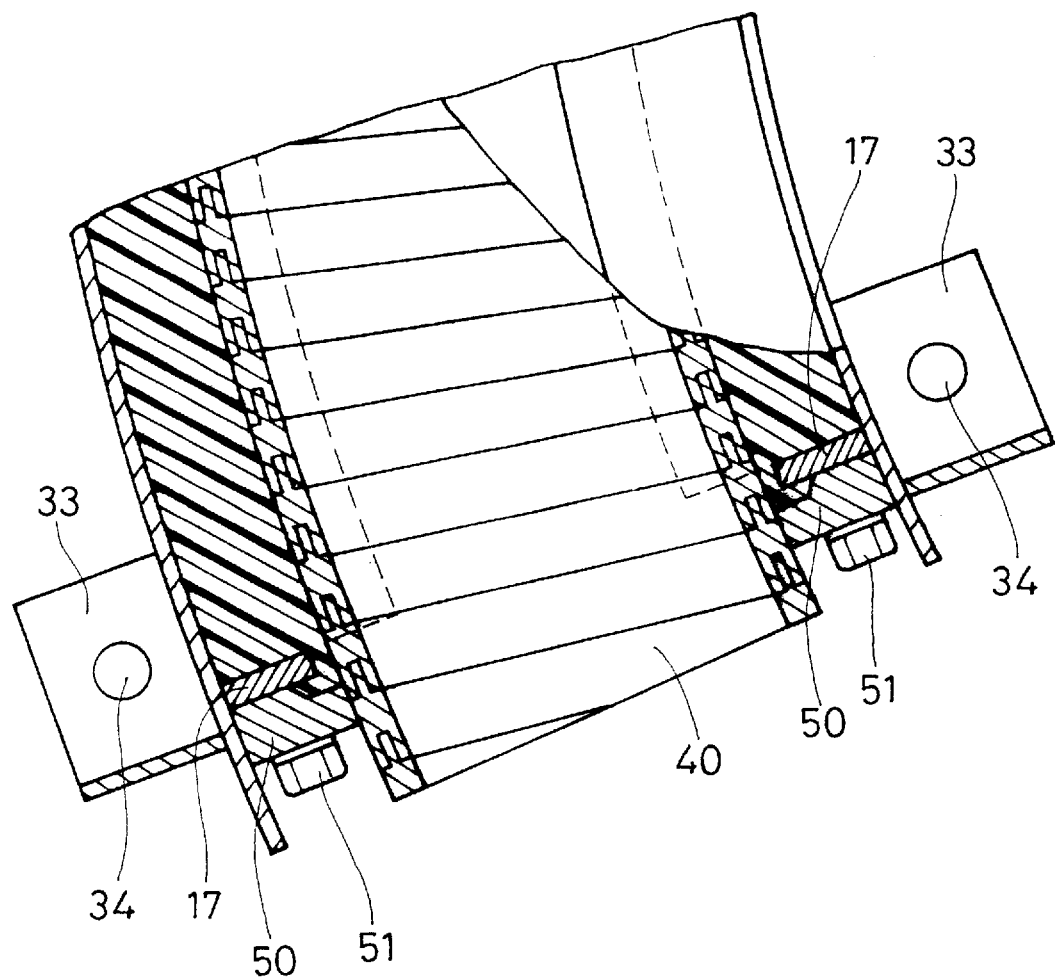
FIG. 19 is a sectional view of the casting mold, showing the ends thereof filled with an urethane resin.
Figure 20:
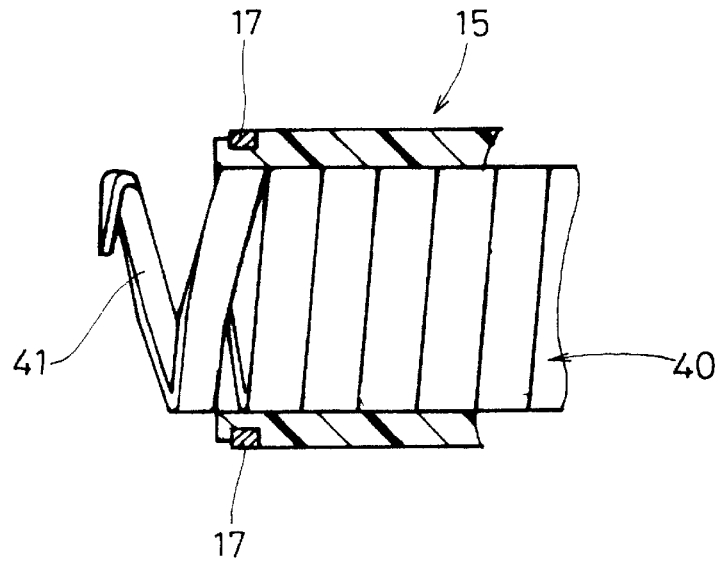
FIG. 20 is a partial sectional view of one end of the split tube, showing a manner of pulling out a core.
Figure 21:
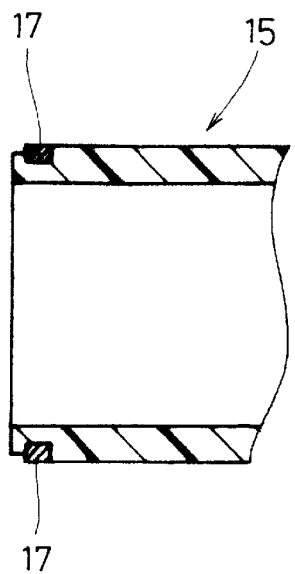
FIG. 21 is a partial sectional view of the end of the split tube.

The core 40 is thus set centrally in the casting mold 30 by means of the positioning pieces 37 and subsequently, the liquid of polyurethane resin is poured into the casting mold 30 through the upper opening thereof (see FIG. 19). Thereafter, the casting mold 30 is left alone until the liquid of polyurethane resin is hardened. When the liquid of polyurethane resin has hardened, the bolts 51 are pulled out for removal of the sealing surface forming molds 50, and the side walls 32 are detached so that a casting is taken out. Thereafter, the core 40 is pulled out of the casting. In this case, the protruded edge 43 and the groove 42 are released from the engagement therebetween when a distal end of the core 40 or a free end of the strip member 41 is held between fingers and then pulled out. As a result, the strip member 41 is unloosened from the helically wound state such that the strip member can continuously be pulled out as if an apple is pared (see FIG. 20). Since the strip member 41 has sufficient flexibility, it can be pulled out to its termination even though the casting is continuously arcuate in the range of about 300 degrees. A hollow tube as shown in FIG. 21 is completed when the entire core 40 has been pulled out. The positioning pieces 37 are left or embedded in the side walls of the split tube 15. However, since the positioning pieces 37 are formed of the same polyurethane resin as the forming resin, unbalance in the wear of the tube, insufficiency in the adhesion and the like need not be taken into consideration.

The operation of the vibratory barrel finishing machine thus constructed will now be described in detail. A predetermined amount of finishing media including abrasive grains and water is loaded through the inlet 12 into the machine and then, the vibrating motor 6 is energized to operate the main body 2. The inner and outer arcuate tube assemblies 7a and 7b are subjected to a forward vibration when workpieces are loaded through the inlet 12. The workpieces are caused to enter the inner arcuate tube assembly 7a through its upper end opening together with the finishing media circulating through the arcuate tube assemblies. The workpieces then move downwardly through the inner arcuate tube assembly 7a. Passing through the lower connecting pipe 8, the workpieces enter the outer arcuate tube assembly 7b. The workpieces move upwardly through the outer arcuate tube assembly 7b, reaching the upper connecting tub 10. In the upper compartment of the tub 10, the finishing media sifts through the screening net 13 into the lower compartment and is then returned to the inner arcuate tube assembly 7a. The finished workpieces left on the screening net 13 further move forward to be taken out of the outlet 14. The cover plate 9 is opened at suitable opportunities so that the abrasive grains and the like used up as the result of repeated finishing operation are discharged through the discharge port 9a.

According to the above-described embodiment, each split tube 15 has two flat superposed faces 16. Each of the inner and outer arcuate tube assemblies 7a and 7b is attached to the main body 2 by laying one split tube 15 upon another such that the superposed faces 16 are superposed one upon another. Consequently, since the number of fixtures used for fixing the inner and outer tube assemblies 7a and 7b to the machine housing is reduced as compared with the prior art, the vibration induced by the vibrating motor 6 can be applied more uniformly to the workpieces and finishing media. Furthermore, smooth movement of the workpieces and finishing media can be secured, and the finishing performance of the machine can be improved.

The split tubes 15 constituting the inner and outer tube assemblies 7a and 7b are formed of the urethane resin by means of monoblock casting. The material for the split tubes 15 is thus uniform. Furthermore, each split tube 15 has an arc of about 300 degrees or may have an arc of more than 300 degrees. Accordingly, the number of joints between the split tubes 15 is reduced. These factors further assist uniform application of vibration. Furthermore, the split tubes 15 constituting each of the tube assemblies 7a and 7b are closely laid one upon another. Consequently, since a space for the mounting of the tube assemblies 7a and 7b is reduced as compared with the prior art, the entire finishing machine can be rendered compact.

Figure 22:
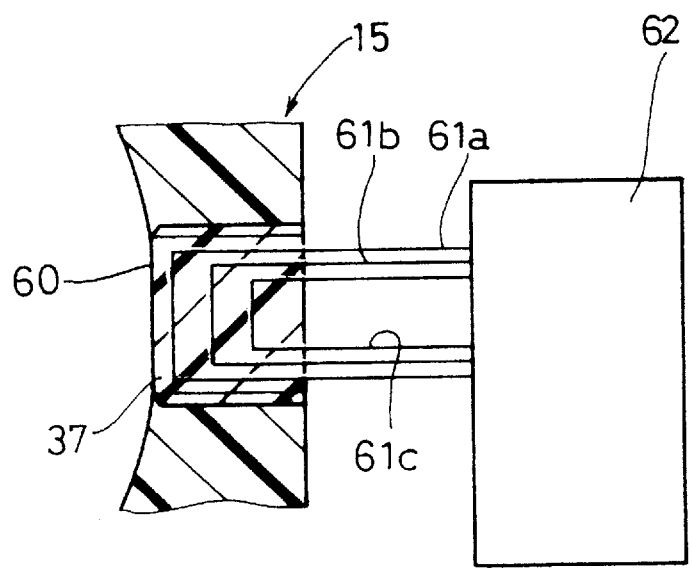
FIG. 22 is a schematic sectional view of a wear detector.

Wear inside the arcuate tube assembly would be inevitable in the finishing machine of the above-described type. In the embodiment, wear in the arcuate tube assemblies 7a and 7b is detected in the following manner. A wear detector 60 is embedded in each positioning piece 37 during manufacture of the arcuate tube assemblies 7a and 7b, as is shown in FIG. 22. Each wear detector 60 comprises a plurality of electrically conductive wires arranged sequentially from the distal end side of the positioning piece 37. Three conductive wires 61a, 61b and 61c are embedded in each positioning piece 37 in the embodiment. The conductive wires 61a–61c are sequentially broken as wear in each arcuate tube assembly progresses. Breakage of the conductive wires 61a–61c is electrically detected by a wire breakage detecting circuit 62, whereby the wear in each of the tube assemblies 7a and 7b can be detected in a stepwise manner.

According to the above-described method of making the tube assembly, the split tubes 15 can be manufactured by the casting. When the split tubes are manufactured by an extrusion molding, an amount of extrusion needs to be varied circumferentially of the split tube 15. However, since the casting does not necessitate such variations in the amount of extrusion, the thickness in the circumferential wall of each split tube 15 can circumferentially be uniform. Furthermore, the core 40 need not be tapered though the split tubes 15 are manufactured by the casting. As a result, the thickness in the circumferential wall of each split tube 15 can also be uniform lengthwise of the tube. Additionally, since the core 40 need not be divided into a plurality of pieces in the above-described casting, the split tubes 15 can easily be manufactured. Moreover, the core 40 can easily be pulled out even when the casting results in one or more partial thicker or thinner portions in the split tube 15. Accordingly, a tube assembly having partially different thicknesses can easily be manufactured. Furthermore, since the core 40 need not be heated to be melted in the above-described method, a molding material may have a low melting point, and the core 40 can be reused.

The present invention may be modified as follows. The finishing machine includes two, that is, inner and outer arcuate tube assemblies 7a and 7b each of which is helically wound to have three turns, in the foregoing embodiment. However, the number of arcuate tube assemblies and the number of turns of each arcuate tube assembly may be changed to various values.

Each of the arcuate tube assemblies 7a and 7b has a thickness uniform lengthwise thereof in the foregoing embodiment. However, the design of the casting mold 30 can easily be changed so that each arcuate tube assembly has one or more partially thickened portions. For example, it is empirically known that an amount of wear is larger in the inner wall surface of each arcuate tube assembly near the cylindrical member 4 than in the other inner wall surfaces thereof. In view of this knowledge, the wall of each arcuate tube assembly near the cylindrical member can previously be rendered thicker.

In the foregoing embodiment, the casting mold 30 has an upper opening, through which the liquid of polyurethane resin is poured into the mold. The casting mold may instead have an upper face closed except for an inlet through which the liquid of forming material is poured.

Figure 23:
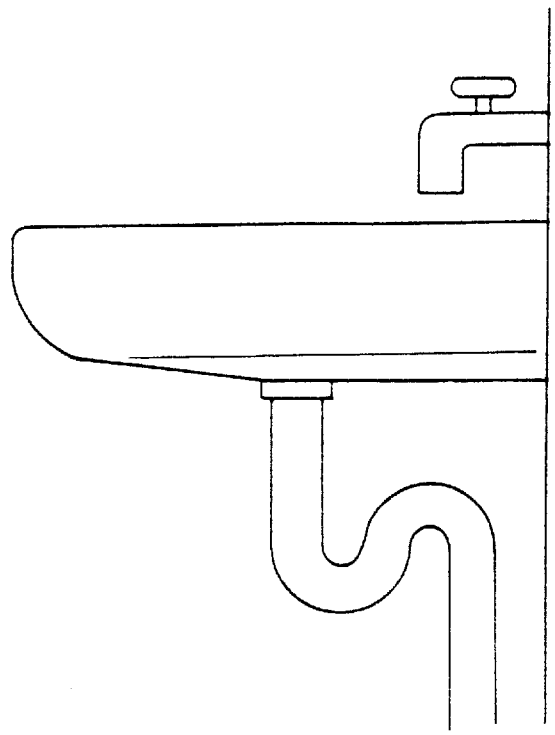
FIG. 23 is a side view of a drain pipe with a U-shaped trap provided in a washstand, to which drain pipe the present invention has been applied in a modified form.
Figure 24:
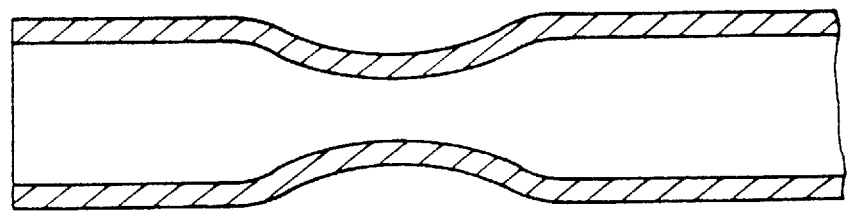
FIG. 24 is a sectional view of a deformed pipe to which the present invent ion has been applied in another modified form.

The arcuate split tubes 15 are manufactured in the foregoing embodiment. However, the method in accordance with the present invention may be applied to manufacture of molded products having a curved through hole regardless of the configurations of products. For example, the method of the present invention may be applied to manufacture of a distributing pipe with a U-shaped trap used in a lavatory or wash stand as shown in FIG. 23 or a deformed pipe having a reduced diameter in its middle as shown in FIG. 24.

The liquid of thermosetting polyurethane resin is used as the forming material in the foregoing embodiment. The forming material may be another thermosetting resin such as acrylic resin, polyester or silicon resin, a liquid of thermoplastic resin, or a concrete material. In brief, any material may be used unless it deforms or deteriorates the strip member forming the core.

The invention is applied to the method of manufacturing the curved tubes used in the vibratory barrel finishing machine in the foregoing embodiment. The invention may be applied to the manufacture of underground pipes through which liquids or gases are caused to flow, e.g., sewer pipes or water-supply pipes, or interior or outdoor piping. Thus, the method of the present invention may be applied to the manufacture of pipes or tubes used in various fields.

The core 40 comprises a strip member 41 having one protruding side edge 42 and in the other a slit 43 into which the protruding edge 42 is continuously inserted. Both side edges of the strip member may be flat without the above-described protrusion and slit respectively, and the strip member may helically be wound with the flat side edge of one turn being lapped over that of another turn.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

We claim:

1. A vibratory finishing machine comprising:
    a base having an upper face;
    resilient support means mounted on said upper face of said base;
    a vibrator having an outer peripheral face, said vibrator being mounted on said base via said resilient support means;
    excitation means mounted on said vibrator;
    a helical tubular container into which an admixture of workpieces to be finished and finishing media are loaded, said container having upper and lower flat superposed faces extending lengthwise thereof and being helically wound on said outer peripheral face of said vibrator at a plurality of turns such that said upper and/or lower superposed faces of each turn of said container are superposed on said lower and/or upper superposed faces of an adjacent turn or turns of said container respectively,
    wherein said helical tubular container comprises a plurality of split tubes, each of said split tubes having first and second ends, and said helical container is formed by connecting one of said first and second ends of one of said split tubes to one of said first and second ends of another of said split tubes so as to form a tubular path having two open ends.

2. A vibratory finishing machine according to claim 1, further comprising:
    a plurality of metal connecting flanges fixed to said first and second ends of said split tubes, respectively, each of said metal connecting flanges has a plurality of bolt-insertion through holes;
    a plurality of fastening bolts inserted through said bolt-insertion through holes of said connecting flanges of said adjacent split tubes, respectively, to connect said adjacent split tubes together; and
    annular seals formed integrally on each of said first and second ends of said split tubes, respectively, so as to be adhered closely to each other when said connecting flanges of said adjacent split tubes are fastened to each other.

3. A vibratory finishing machine according to claim 2, wherein each of said split tubes is formed by casting a synthetic resin material, and each of said split tubes includes a wear detector for detecting wear of an inner wall of said split tube.

4. A vibratory finishing machine according to claim 3, wherein each of said wear detectors comprises a detecting wire which is adapted to be disconnected upon occurrence of a predetermined amount of wear of said split tube inner wall.

5. A vibratory finishing machine according to claim 3, wherein each of said wear detectors comprises a plurality of detecting wires which are adapted to be disconnected upon occurrence of a predetermined amount of wear of said split tube inner wall, said detecting wires being arranged so as to extend from near said inner wall face toward an outer peripheral surface of said split tube.

6. A vibratory finishing machine according to claim 1, wherein each of said split tubes is formed by casting a synthetic resin material, and each of said split tubes includes a wear detector for detecting wear of an inner wall of said split tube.

7. A vibratory finishing machine according to claim 6, wherein each of said wear detectors comprises a detecting wire which is adapted to be disconnected upon occurrence of a predetermined amount of wear of said split tube inner wall.

8. A vibratory finishing machine according to claim 6, wherein each of said wear detectors comprises a plurality of detecting wires which are adapted to be disconnected upon occurrence of a predetermined amount of wear of said split tube inner wall, said detecting wires being arranged so as to extend from near said inner wall face toward an outer peripheral surface of said split tube.

9. A vibratory finishing machine comprising:
- a base having an upper face;
- resilient support means mounted on said upper face of said base;
- a vibrator having an outer peripheral face, said vibrator being mounted on said base via said resilient support means;
- excitation means mounted on said vibrator;
- a helical tubular container into which an admixture of workpieces to be finished and finishing media are loaded, said container having upper and lower flat superposed faces extending lengthwise thereof and being helically wound on said outer peripheral face of said vibrator at a plurality of turns such that said upper and/or lower superposed faces of each turn of said container are superposed on said lower and/or upper superposed faces of an adjacent turn or turns respectively, wherein said helical tubular container comprises a plurality of cast split tubes formed of a synthetic resin material, and a plurality of wear detectors embedded in said split tubes, respectively, for detecting wear of an inner wall of said split tubes.

10. A vibratory finishing machine according to claim 9, wherein each of said wear detectors comprises a detecting wire which is adapted to be disconnected upon occurrence of a predetermined amount of wear of said split tube inner wall.

11. A vibratory finishing machine according to claim 9, wherein each of said wear detectors comprises a plurality of detecting wires which are adapted to be disconnected upon occurrence of predetermined amounts of wear of said split tube inner wall, said detecting wires being arranged so as to extend from near said inner wall face toward an outer peripheral surface of said split tube.

* * * * *